US012631851B2

(12) United States Patent
Eromaki

(10) Patent No.: US 12,631,851 B2
(45) Date of Patent: May 19, 2026

(54) SUSPENDED ACTUATOR

(71) Applicant: Microsoft Technology Licensing, LLC, Redmond, WA (US)

(72) Inventor: Marko Eromaki, Tampere (FI)

(73) Assignee: Microsoft Technology Licensing, LLC., Redmond, WA (US)

( * ) Notice: Subject to any disclaimer, the term of this patent is extended or adjusted under 35 U.S.C. 154(b) by 0 days.

(21) Appl. No.: 18/146,656

(22) Filed: Dec. 27, 2022

(65) Prior Publication Data

US 2023/0130000 A1 Apr. 27, 2023

Related U.S. Application Data

(63) Continuation of application No. 15/163,661, filed on May 24, 2016, now Pat. No. 11,536,930.

(51) Int. Cl.
| | |
|---|---|
| *G02B 7/08* | (2021.01) |
| *G02B 7/04* | (2021.01) |
| *G02B 27/64* | (2006.01) |
| *G06F 1/16* | (2006.01) |
| *H04M 1/02* | (2006.01) |
| *H04N 5/225* | (2006.01) |
| *H04N 23/57* | (2023.01) |
| *G02B 13/00* | (2006.01) |
| *H04N 23/55* | (2023.01) |
| *H04N 23/68* | (2023.01) |

(52) U.S. Cl.
CPC ............. *G02B 7/08* (2013.01); *G02B 27/646* (2013.01); *G06F 1/1686* (2013.01); *H04N 23/57* (2023.01); *G02B 7/04* (2013.01); *G02B 13/001* (2013.01); *H04M 1/0264* (2013.01); *H04N 23/55* (2023.01); *H04N 23/68* (2023.01)

(58) Field of Classification Search
CPC .... G03B 2205/0007; G03B 2205/0015; G03B 2205/0046; G03B 2205/0053; G03B 2205/0069; G03B 5/00; G03B 5/02; G03B 5/04; G02B 27/64; G02B 27/646; G02B 7/026; G02B 7/04; G02B 7/08; G02B 7/28; G02B 7/282; H04N 5/2254; H04N 5/23287
USPC ........ 359/557, 824, 825; 396/55; 310/13, 14, 310/16, 12.31, 12.01
See application file for complete search history.

(56) References Cited

U.S. PATENT DOCUMENTS

| | | | | |
|---|---|---|---|---|
| 2013/0208369 | A1* | 8/2013 | Lam | G03B 17/02 |
| | | | | 359/823 |
| 2016/0070115 | A1* | 3/2016 | Miller | G03B 5/02 |
| | | | | 359/557 |
| 2017/0192195 | A1* | 7/2017 | Murakami | G02B 27/646 |

* cited by examiner

*Primary Examiner* — Marin Pichler
(74) *Attorney, Agent, or Firm* — Barta Jones, PLLC

(57) ABSTRACT

An imaging apparatus comprises two actuators, such as an autofocus actuator and optical image stabilizer. The actuators are nested, wherein the outer actuator is suspended from the device body and the inner actuator is suspended from the outer actuator. A suspension element may be a flexure bearing, allowing a flat actuator design.

20 Claims, 5 Drawing Sheets

410

420

240

440

430

SUSPENDED ACTUATOR

CROSS-REFERENCE TO RELATED APPLICATION

This application is a continuation application of and claims priority to U.S. patent application Ser. No. 15/163, 661, entitled "A SUSPENDED ACTUATOR," filed on May 24, 2016, the disclosure of which is incorporated herein by reference in its entirety.

BACKGROUND

Digital cameras usually comprise a lens and a sensor for capturing an image by collecting light and converting it into electrical signals. Mobile electronic devices such as smart phones are usually equipped with an imaging apparatus, for example, a camera. The imaging quality of the mobile electronic devices may be improved by optical image sta-bilization or autofocus. A current trend in designing mobile electronic devices aims for thin devices, wherein the form factor benefits from thin imaging apparatus to be housed inside the mobile electronic device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The imaging apparatus comprises two lens group actua-tors, enabling the lens group to be moved laterally and horizontally to achieve autofocus and optical image stabili-zation. The lens group actuators are nested, wherein a second lens group actuator is positioned inside a first lens group actuator. The outer lens group actuator is suspended from the device body and the inner lens group actuator is suspended from the outer lens group actuator. A suspension element may be a flexure bearing, allowing a flat actuator design.

Many of the attendant features will be more readily appreciated as they become better understood by reference to the following detailed description considered in connec-tion with the accompanying drawings. The embodiments described below are not limited to implementations which solve any or all of the disadvantages of known imaging apparatuses integrated in hand-held devices.

DESCRIPTION OF THE DRAWINGS

The present description will be better understood from the following detailed description read in light of the accompa-nying drawings, wherein.

Like reference numerals are used to designate like parts in the accompanying drawings.

DETAILED DESCRIPTION

The detailed description provided below in connection with the appended drawings is intended as a description of the present embodiments and is not intended to represent the only forms in which the present embodiments may be constructed or utilized. However, the same or equivalent functions and sequences may be accomplished by different embodiments.

Although the present embodiments are described and illustrated herein as being implemented in a smartphone, the device described is provided as an example and not a limitation. As those skilled in the art will appreciate, the present embodiments are suitable for application in a variety of different types of mobile and/or hand-held apparatuses, e.g. in tablets, laptops, digital cameras or gaming consoles.

Figure 1:
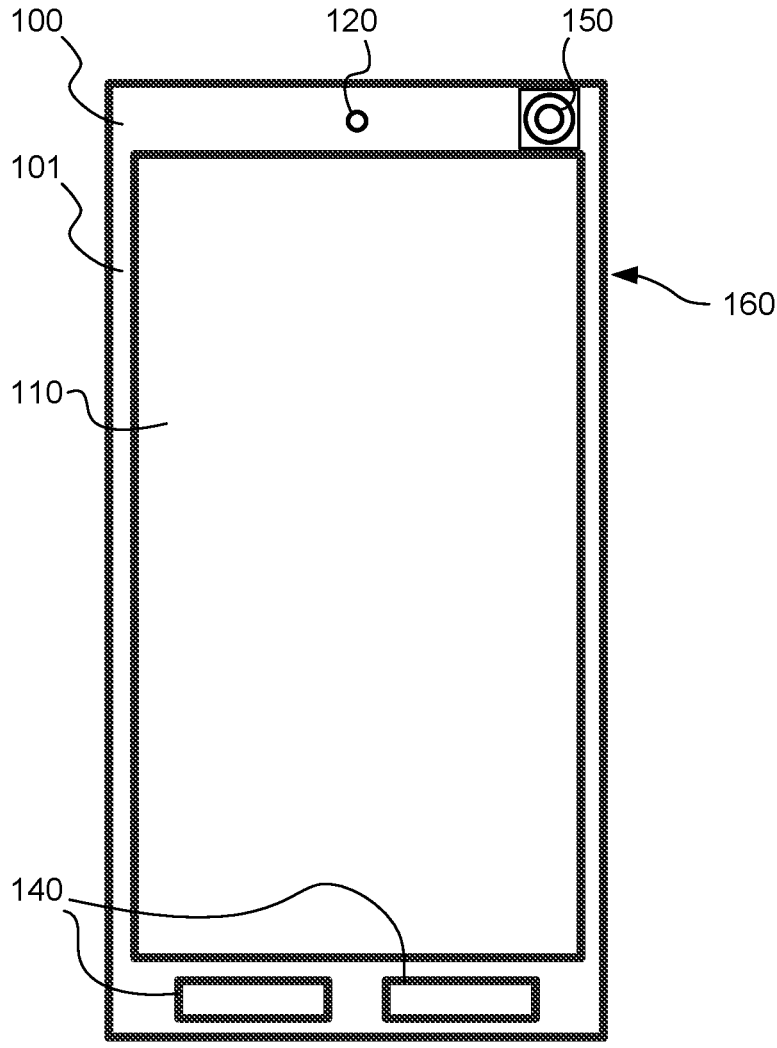
FIG. 1 shows one embodiment of an electronic device incorporating an imaging apparatus.

FIG. 1 shows a front side of one example of an electronic device incorporating an imaging apparatus, wherein one embodiment of the electronic device is a smartphone. The electronic device comprises a body 100 comprising a display 110, a speaker 120, a microphone 130 and keys 140. The electronic device comprises an imaging apparatus 150, a camera on one surface. The electronic device may comprise one camera or more cameras, for example a front camera 150 on the front surface and another imaging apparatus, a rear camera 160 on the rear side. The camera hardware may comprise at least one of: a processor, a controller, a memory, or a sensor such as a gyroscope. A wiring, such a flex cable may connect the imaging apparatus to the electronic device.

Figure 2:
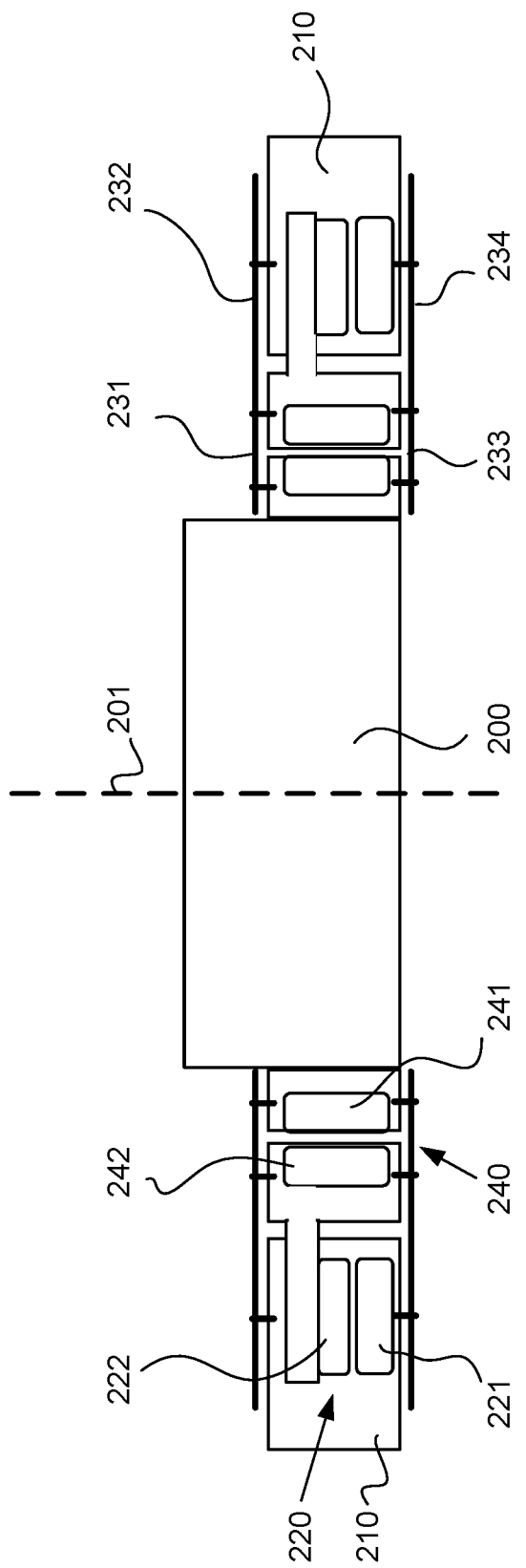
FIG. 2 shows a simplified cross-sectional view illustrating one embodiment of a device having two lens group actuators having nested positions.

FIG. 2 is a simplified cross-sectional view illustrating one embodiment of a device having two lens group actuators positioned in parallel. The device comprises a first lens group 200 on an optical axis 201, wherein the first lens group 200 is movable along the optical axis 201 and transversely to the optical axis 201. The optical axis 201 is a line along which there is some degree of rotational symmetry in an optical system. The optical axis is an imaginary line that defines a path along which light propagates through the system, for example to the image sensor. The first lens group 200 may comprise only one lens or it may be a combination of several lenses. The first lens group 200 comprises the lens through which the light travels to the image sensor. The device, an imaging apparatus or a system comprising the components described herein may comprise more compo-nents to enable the full functionality, such as a second or a third lens group, a field flattener lens, an image sensor, housing or other components. The optical image stabiliza-tion or autofocus functions may be enabled by moving only one lens group. The device comprises a body 210, a portion of the body 210 or a portion fixed to the body, wherein the movable actuator parts are supported. The first lens group 200 comprises the lens through which the light travels to the image sensor group.

A first lens group actuator 240 is configured to move the first lens group 200 along the optical axis 201. The first lens group actuator is coupled to the first lens group 200. An actuator may be defined by converting electrical energy into mechanical movement. In an embodiment the first lens group actuator 240 enables the autofocus function. In an embodiment, the first lens group actuator 240 is configured to alter the optical zoom factor. In an embodiment, the optical zoom factor is altered by an actuator configured inside the lens group, for example inside a lens barrel. The autofocus actuator 240 is an example of a lens group actuator. The autofocus may use the information received from the image processing or other environmental information in defining the correct focus for the image plane and the image sensor. In an embodiment the first lens group actuator 240 comprises a ferromagnetic element 242 having poles aligned to generate a magnetic field and an electromagnetic element 241 having a coil made of electric conductor. As a response to an electric current passing though the electromagnetic element 241, a magnetic field is generated by the electromagnetic element having poles aligned to interact with the ferromagnetic element 242, causing the movement along the optical axis 201.

A second lens group actuator 220 is configured to move the first lens group 200 transversely to the optical axis 201. In an embodiment the second lens group actuator 220 enables the optical image stabilization. The optical image stabilization may use the information received from the image processing or other environmental information such as gyroscope information in defining the correct position for the first lens group 200 counteracting the shaking of the device.

In an embodiment the second lens group actuator 220 comprises a ferromagnetic element 222 having poles aligned to generate a magnetic field and an electromagnetic element 221 having a coil made of electric conductor. As a response to an electric current passing though the electromagnetic element 221, a magnetic field is generated by the electromagnetic element 221 having poles aligned to interact with the ferromagnetic element 222, causing the movement of the first lens group 200 transversely to the optical axis 201.

The second lens group actuator 220 is at the same level as the first lens group actuator 240 along the optical axis 201. In one embodiment the first lens group actuator 240 is nested inside the second lens group actuator 220. The first lens group actuator 240 is connected to the first lens group 200. The second lens group actuator 220 is connected between the first lens group actuator 240 and the body 210. The arrangement of the nested two actuators is a flat design, allowing the imaging apparatus and the device to be designed flat-shaped.

The first lens group actuator 240 is configured to float inside the second lens group actuator 220, as the mechanical connection is enabled by suspension elements. A first suspension element 231 is configured to suspend the first lens group actuator 240 from the second lens group actuator 220. A second suspension element 232 is configured to suspend the second lens group actuator 220 from the body.

In one embodiment the first suspension element 231 is configured to transfer an electric signal between the first lens group actuator 240 and the second lens group actuator 220. In one embodiment the second suspension element 232 is configured to transfer an electric signal between the second lens group actuator 220 and the body 210. The electric signal is transferred between the body 210 and at least one processor configured to control the at least one actuator. The body 210 is illustrated here as an example of an interface for the electrical and mechanical couplings. The electric signal may be a control signal for the actuator or a feedback signal from the actuator to the device.

In one embodiment the first suspension element 231 is configured to suspend the first lens group actuator 240 from the second lens group actuator 220 at a first position 251 perpendicular to the optical axis 201 and comprising a third suspension element 233 configured to suspend the first lens group actuator 240 from the second lens group actuator 220 at a third position 253 perpendicular to the optical axis 201. The first lens group actuator 240 may be suspended from an upper position 251 and a lower position 253. In one embodiment the second suspension element 232 is configured to suspend the second lens group actuator 220 from the body 210 at a second position 252 perpendicular to the optical axis 201 and comprising a fourth suspension element 234 configured to suspend the second lens group actuator 220 from the body 210 at a fourth position 254 perpendicular to the optical axis 201. The coupling of the nested actuator structure may be more stable, having several points of suspension. This may reduce the tilting effect of the first lens group 200 as a response to actuator movements.

In one embodiment at least one suspension element of the group having the first suspension element 231, the second suspension element 232, the third suspension element 233 and the fourth suspension element 234 comprise a flexure bearing. A flexure bearing is one example of a supporting structure allowing motion by bending. In one embodiment the flexure bearing is made of sheet metal.

Figure 3A:
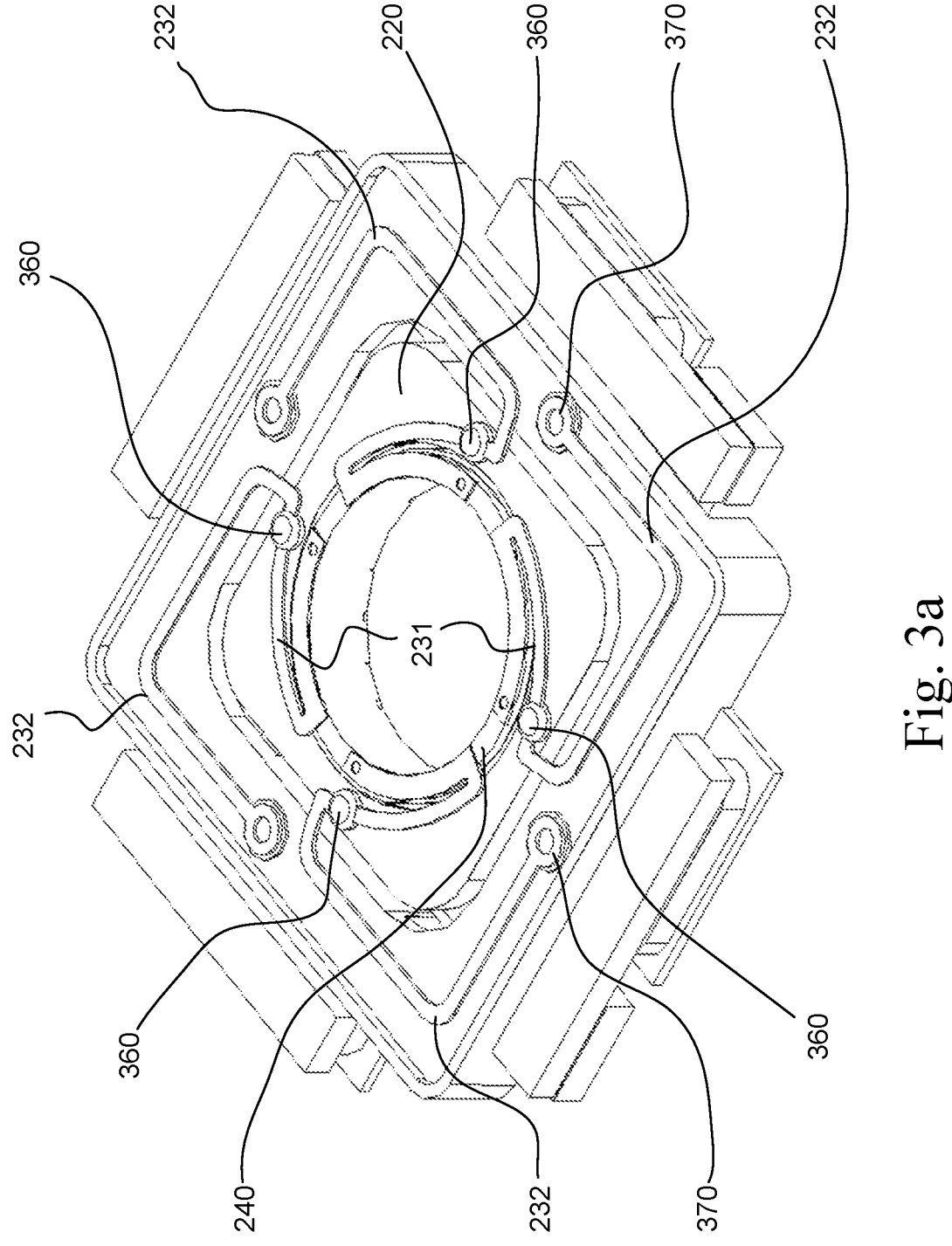
FIG. 3a illustrates one embodiment from the top side.
Figure 3B:
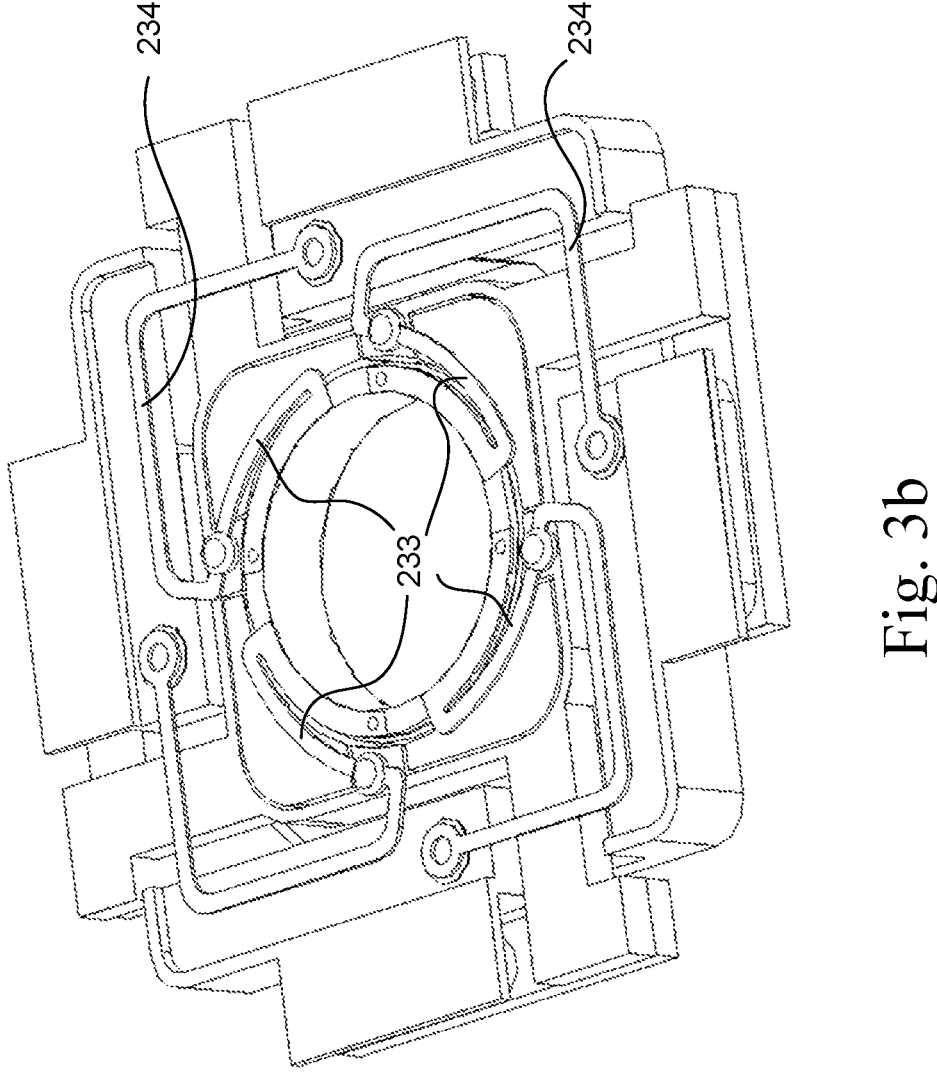
FIG. 3b illustrates the embodiment from the bottom side.

In one embodiment a suspension element combines two suspension elements. For example the first suspension element 231 and the second suspension element 232 may be made of single piece of sheet metal. FIG. 3*a* illustrates one embodiment of the structure having combined suspension elements from a top side and FIG. 3*b* illustrates the structure from a bottom side. The first lens group 200 is omitted from the figures—it may be mounted inside the first lens group actuator 240. In this embodiment four instances of the first suspension element 231 and the second suspension element 232 are implemented. The arrangement may improve the stability of the suspension against tilting the first lens group 200. Although the suspension elements are spread along the lens group actuator, the functionality may refer to one suspension element. In one embodiment each suspension element may be used to transmit different electric signals for different purposes. A tab 360 is configured to connect the suspension element to the second lens group actuator 220. The tab 360 is in one embodiment a plastic tab configured to receive the suspension element and widened by pressing it during the manufacturing. The tab 360 connects the first suspension element 231 and the second suspension element to the second lens actuator 220. In one embodiment the connections are established by two tabs on the second lens actuator 220 having a conductor between the two tabs. The second suspension element may be connected to the body with a tab 370. FIG. 3*b* shows similar arrangement from the bottom side, wherein the position of the suspension elements is different along the optical axis to the position of suspension elements on the top side.

In one embodiment the first lens group actuator 240 and the second lens group actuator 220 are positioned in parallel. The actuator structure may be open, not completing a full circle around the lens group 200. The open side of the actuator may be supported by a bearing allowing movement suitable for the lens group actuator, for example vertical movement for the autofocus actuator and horizontal movement for the optical image stabilizer.

Figure 4:
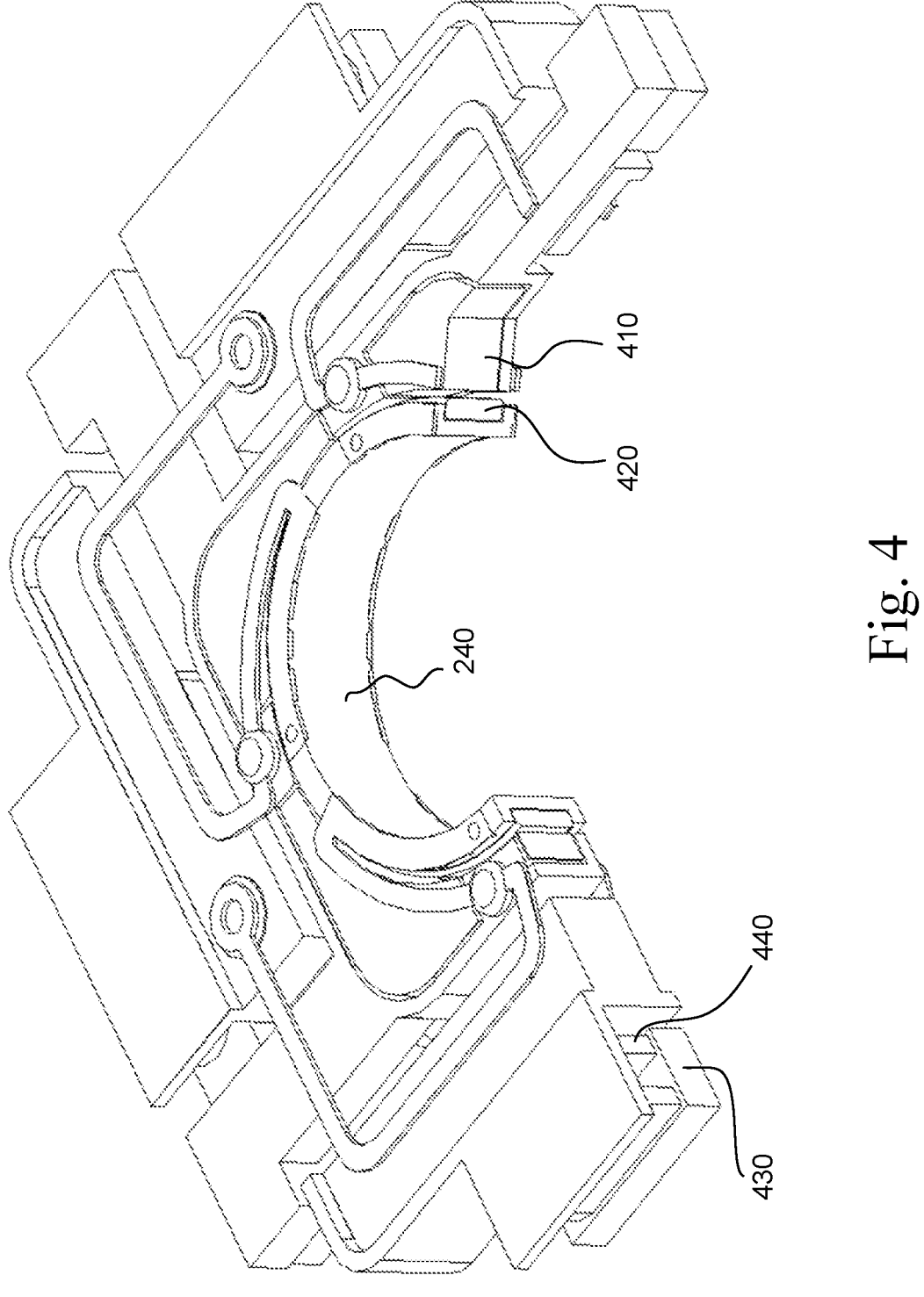
FIG. 4 illustrates a simplified cross-sectional view of one embodiment having the first and the second lens group actuator.

FIG. 4 illustrates a simplified cross-sectional view of one embodiment having both actuators. The first lens group actuator 240 comprises a ferromagnetic element 410 having poles aligned to generate a magnetic field and an electromagnetic element 420 having poles aligned to generate a magnetic field as a response to an electric current passing though the electromagnetic element 420. The electromagnetic element 420 is in one embodiment a coil made of electric wire. The second lens group actuator 220 comprises a ferromagnetic element 430 having poles aligned to generate a magnetic field and an electromagnetic element 440 having poles aligned to generate a magnetic field as a response to an electric current passing though the electromagnetic element 440. The electromagnetic element 440 is in one embodiment a coil made of electric wire. The electromagnetic element 440 is positioned at the outer edge of the second lens group actuator 220 and at the same level as the first lens group actuator 240.

In one embodiment the suspension for the autofocus and the optical image stabilization is a shared suspension system, having the first suspension element and the second suspension element, enabling floating to all directions in three-dimensional coordinates. In one embodiment the positioning of the suspension elements in different positions along the optical axis allows a low tilt error for vertically moving autofocus system, improving the performance of the autofocus system. The mechanical coupling between autofocus and optical image stabilization may be located between the upper and lower suspension element. The coupling enables the center aperture section, for example the lens assembly base, to be electrically moved in all directions. In one embodiment the autofocus unit is positioned inside the optical image stabilization, wherein the flexure bearing is made of metal, allowing the flexures to be used for electrical connections to the electromagnetic coil of the autofocus. In one embodiment the electromagnetic coils for the optical image stabilization are positioned outside the autofocus, wherein the autofocus may comprise discrete powering wires without affecting the core structure. The flexure bearing may be utilized in transferring electrical signals between the device body and one of the lens group actuators. The structure allows imaging apparatuses with better optical characteristics to be implemented for example in very thin devices. Devices with various form factors may benefit from smaller imaging apparatus as there is more room to implement other features in the device.

One aspect discloses a device, comprising a body; a first lens group on an optical axis; a first lens group actuator configured to move the first lens group along the optical axis; a second lens group actuator configured to move the first lens group transversely to the optical axis, wherein the second lens group actuator is at the same level as the first lens group actuator; a first suspension element configured to suspend the first lens group actuator from the second lens group actuator; and a second suspension element configured to suspend the second lens group actuator from the body. In an embodiment the device comprises two lens group actuators, wherein the first lens group actuator is an autofocus actuator and the second lens group actuator is an optical image stabilizer. In an embodiment the first suspension element is configured to transfer an electric signal between the first lens group actuator and the second lens group actuator. In an embodiment the second suspension element is configured to transfer an electric signal between the second lens group actuator and the body. In an embodiment the first suspension element is configured to suspend the first lens group actuator from the second lens group actuator on a first position perpendicular to the optical axis and comprising a third suspension element configured to suspend the first lens group actuator from the second lens group actuator on a third position perpendicular to the optical axis. In an embodiment the second suspension element is configured to suspend the second lens group actuator from the body on a second position perpendicular to the optical axis and comprising a fourth suspension element configured to suspend the second lens group actuator from the body at a fourth position perpendicular to the optical axis. In an embodiment the suspension element comprises a flexure bearing. In an embodiment the flexure bearing is made of sheet metal. In an embodiment the second lens group actuator comprises a ferromagnetic element having poles aligned to generate a magnetic field and an electromagnetic element having poles aligned to generate a magnetic field as a response to an electric current passing though the electromagnetic element, the electromagnetic element having coil for the electric current positioned at the outer edge of the second lens group actuator and at the same level as the first lens group actuator.

Alternatively or in addition, one aspect discloses an imaging apparatus, comprising a body; a first lens group on an optical axis; an autofocus actuator configured to move the first lens group along the optical axis; an optical image stabilizer configured to move the first lens group transversely to the optical axis, wherein the optical image stabilizer is at the same level as the autofocus actuator; a first suspension element configured to suspend the autofocus actuator from the optical image stabilizer; and a second suspension element configured to suspend the optical image stabilizer from the body. In an embodiment the first suspension element is configured to transfer an electric signal between the autofocus actuator and the optical image stabilizer and the second suspension element is configured to transfer an electric signal between the body and the optical image stabilizer. In an embodiment the first suspension element is configured to suspend the autofocus actuator from the optical image stabilizer at a first position perpendicular to the optical axis and comprising a third suspension element configured to suspend the autofocus actuator from the optical image stabilizer at a third position perpendicular to the optical axis. In an embodiment the second suspension element is configured to suspend the optical image stabilizer from the body at a second position perpendicular to the optical axis and comprising a fourth suspension element configured to suspend the optical image stabilizer from the body at a fourth position perpendicular to the optical axis. In an embodiment the suspension element comprises a flexure bearing.

Alternatively or in addition, one aspect discloses a system, comprising: a body; a first lens group on an optical axis; an autofocus actuator configured to move the first lens group along the optical axis; an optical image stabilizer configured to move the first lens group transversely to the optical axis, wherein the optical image stabilizer is at the same level as the autofocus actuator; a first suspension element configured to suspend the autofocus actuator from the optical image stabilizer; and a second suspension element configured to suspend the optical image stabilizer from the body. In an embodiment the first suspension element is configured to transfer an electric signal between the autofocus actuator and the optical image stabilizer and the second suspension element is configured to transfer an electric signal between the autofocus actuator and the body. In an embodiment the first suspension element is configured to suspend the autofocus actuator from the optical image stabilizer at a first position perpendicular to the optical axis and comprising a third suspension element configured to suspend the autofocus actuator from the optical image stabilizer at a third position perpendicular to the optical axis. In an embodiment the second suspension element is configured to suspend the optical image stabilizer from the body at a second position perpendicular to the optical axis and comprising a fourth suspension element configured to suspend the optical image stabilizer from the body at a fourth position perpendicular to the optical axis. In an embodiment the suspension element comprises a flexure bearing made of sheet metal. In an embodiment the optical image stabilizer comprises a ferromagnetic element having poles aligned to generate a magnetic field and an electromagnetic element having poles aligned to generate a magnetic field as a response to an electric current passing though the electromagnetic element, the electromagnetic element having coil for the electric current positioned at the outer edge of the optical image stabilizer and at the same level as the autofocus actuator.

An example of the apparatus or a system described hereinbefore is a computing-based device comprising one or more processors which may be microprocessors, controllers or any other suitable type of processors for processing computer executable instructions to control the operation of the device in order to control one or more sensors, receive sensor data and use the sensor data. Platform software comprising an operating system or any other suitable platform software may be provided at the computing-based device to enable application software to be executed on the device.

The computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The computing-based device may comprise an input/output controller arranged to output display information to a display device which may be separate from or integral to the computing-based device. The display information may provide a graphical user interface, for example, to display hand gestures tracked by the device using the sensor input or for other display purposes. The input/output controller is also arranged to receive and process input from one or more devices, such as a user input device (e.g. a mouse, keyboard, camera, microphone or other sensor). In some embodiments the user input device may detect voice input, user gestures or other user actions and may provide a natural user interface (NUI). This user input may be used to configure the device for a particular user such as by receiving information about bone lengths of the user. In an embodiment the display device may also act as the user input device if it is a touch sensitive display device. The input/output controller may also output data to devices other than the display device, e.g. a locally connected printing device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

Any range or device value given herein may be extended or altered without losing the effect sought.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

In the above description, some component, device, module, unit, or element "being configured to" operate in a specific manner or to carry out specific operations, or carrying out such operations when in use, refers to that component, device, module, unit, or element comprising, or itself serving as, "means for" operating in that manner or carrying out those operations.

For example the first lens group actuator configured to move the first lens group along the optical axis means that the first lens group actuator comprises, or serves as, means for moving the first lens group. As another example, a second lens group actuator configured to move the first lens group transversely to the optical axis comprises, or serves as, means for moving the first lens group transversely to the optical axis.

It will be understood that the benefits and advantages described above may relate to one embodiment or may relate to several embodiments or a combination thereof. The embodiments are not limited to those that solve any or all of the stated problems or those that have any or all of the stated benefits and advantages. It will further be understood that reference to 'an' item refers to one or more of those items.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to or combinations of the disclosed embodiments without departing from the spirit or scope of this specification.

The invention claimed is:

1. A device, comprising:
   a body;
   a first lens group on an optical axis;
   a first lens group actuator comprising a first ferromagnetic element and a first electromagnetic element configured to cause the first lens group to move along the optical axis;
   a second lens group actuator comprising a second ferromagnetic element and a second electromagnetic element configured to cause the first lens group to move transversely to the optical axis;

a top suspension element comprising a first suspension element and a second suspension element the first suspension element configured to suspend the first lens group actuator from the second lens group actuator;

the second suspension element configured to suspend the second lens group actuator from the body;

a bottom suspension element comprising a third suspension element and a fourth suspension element, wherein the first lens group actuator and the second lens group actuator are positioned entirely between the top suspension element and the bottom suspension element;

the third suspension element configured to suspend the first lens group actuator from the second lens group actuator; and the fourth suspension element configured to suspend the second lens group actuator from the body;

wherein the first suspension element is configured to transfer an electric signal between the first lens group actuator and the second lens group actuator and the second suspension element is configured to transfer an electric signal between the body and the second lens group actuator.

2. A device according to claim 1, wherein the second ferromagnetic element is positioned between a top portion of the second electromagnetic element and the top suspension element.

3. A device according to claim 2, wherein the first lens group actuator is between the first lens group and the second lens group actuator.

4. A device according to claim 1, wherein at least a first portion of the first suspension element and at least a second portion of the second suspension element are made of a single piece of material.

5. A device according to claim 1, wherein the first suspension element is configured to suspend the first lens group actuator from the second lens group actuator at a first position perpendicular to the optical axis and wherein the third suspension element is substantially parallel to the first and second suspension elements, the third suspension element configured to suspend the first lens group actuator from the second lens group actuator at a third position perpendicular to the optical axis.

6. A device according to claim 1, wherein the second suspension element is configured to suspend the second lens group actuator from the body at a second position perpendicular to the optical axis and wherein the fourth suspension element is substantially parallel to the first and second suspension elements, the fourth suspension element configured to suspend the second lens group actuator from the body at a fourth position perpendicular to the optical axis.

7. A device according to claim 1, wherein the first electromagnetic element is between the first ferromagnetic element and the first lens group, and wherein the second electromagnetic element is positioned at an outer edge of the second lens group actuator and at a same level as the first lens group actuator.

8. A device according to claim 7, wherein the second lens group actuator enables optical image stabilization.

9. A device according to claim 8, wherein the second electromagnetic element has a coil for an electric current positioned at an outer edge of the second lens group actuator and at a same level as the first lens group actuator.

10. An imaging apparatus, comprising:

a body;

a first lens group on an optical axis;

an autofocus actuator comprising a first ferromagnetic element and a first electromagnetic element configured to cause the first lens group to move along the optical axis;

an optical image stabilizer comprising a second ferromagnetic element and a second electromagnetic element configured to cause the first lens group to move transversely to the optical axis;

a top suspension element comprising a first suspension element and a second suspension element;

the first suspension element configured to suspend the autofocus actuator from the optical image stabilizer;

the second suspension element configured to suspend the optical image stabilizer from the body;

a bottom suspension element comprising a third suspension element and a fourth suspension element, wherein the autofocus actuator and the optical image stabilizer are positioned entirely between the top suspension element and the bottom suspension element;

the third suspension element configured to suspend the autofocus actuator from the optical image stabilizer; and the fourth suspension element configured to suspend the optical image stabilizer from the body;

wherein the first suspension element is configured to transfer an electric signal between the autofocus actuator and the optical image stabilizer and the second suspension element is configured to transfer an electric signal between the body and the optical image stabilizer.

11. An imaging apparatus according to claim 10, wherein the autofocus actuator is between an optical image and the optical axis.

12. An imaging apparatus according to claim 10, wherein the first suspension element is configured to suspend the autofocus actuator from the optical image stabilizer at a first position perpendicular to the optical axis and the third suspension element configured to suspend the autofocus actuator from the optical image stabilizer at a third position perpendicular to the optical axis.

13. An imaging apparatus according to claim 10, wherein the second suspension element is configured to suspend the optical image stabilizer from the body at a second position perpendicular to the optical axis and the fourth suspension element configured to suspend the optical image stabilizer from the body at a fourth position perpendicular to the optical axis.

14. An imaging apparatus according to claim 10, wherein at least a first portion of the first suspension element and at least a second portion of the second suspension element are made of a single piece of material, and wherein the single piece of material is sheet metal.

15. A system, comprising:

a body;

a first lens group on an optical axis;

an autofocus actuator comprising a first ferromagnetic element and a first electromagnetic element configured to cause the first lens group to move along the optical axis;

an optical image stabilizer comprising a second ferromagnetic element and a second electromagnetic element configured to cause the first lens group to move transversely to the optical axis;

a top suspension element comprising a first suspension element and a second suspension element;

the first suspension element configured to suspend the autofocus actuator from the optical image stabilizer;

the second suspension element configured to suspend the optical image stabilizer from the body;

a bottom suspension element comprising a third suspension element and a fourth suspension element, wherein the autofocus actuator and the optical image stabilizer are positioned entirely between the top suspension element and the bottom suspension element;

the third suspension element configured to suspend the autofocus actuator from the optical image stabilizer; and the fourth suspension element configured to suspend the optical image stabilizer from the body;

wherein the first suspension element is configured to transfer an electric signal between the autofocus actuator and the optical image stabilizer and the second suspension element is configured to transfer an electric signal between the body and the optical image stabilizer.

16. A system according to claim 15, wherein the autofocus actuator is between the optical image stabilizer and the first lens group.

17. A system according to claim 15, wherein the first suspension element is configured to suspend the autofocus actuator from the optical image stabilizer at a first position perpendicular to the optical axis and the third suspension element configured to suspend the autofocus actuator from the optical image stabilizer at a third position perpendicular to the optical axis.

18. A system according to claim 15, wherein the second suspension element is configured to suspend the optical image stabilizer from the body at a second position perpendicular to the optical axis and the fourth suspension element configured to suspend the optical image stabilizer from the body at a fourth position perpendicular to the optical axis.

19. A system according to claim 15, wherein the first suspension element comprises a flexure bearing made of sheet metal.

20. A system according to claim 15, wherein the second electromagnetic element has a coil for an electric current positioned at an outer edge of the optical image stabilizer and at a same level as the autofocus actuator.

* * * * *